(12) United States Patent
Rahmany

(10) Patent No.: US 11,983,457 B2
(45) Date of Patent: *May 14, 2024

(54) DEVICE FOR SECURE UNIDIRECTIONAL AUDIO TRANSMISSION

(71) Applicant: FIBERNET LTD., Yokneam Illit (IL)

(72) Inventor: Ilan Rahmany, Ganei Tikva (IL)

(73) Assignee: FIBERNET LTD., Yokneam Illit (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/750,587

(22) Filed: May 23, 2022

(65) Prior Publication Data

US 2022/0283771 A1  Sep. 8, 2022

Related U.S. Application Data

(63) Continuation of application No. 16/846,547, filed on Apr. 13, 2020, now Pat. No. 11,340,860.

(30) Foreign Application Priority Data

Apr. 17, 2019 (IL) .......................................... 266118

(51) Int. Cl.
*G06F 3/16* (2006.01)
*H04R 5/033* (2006.01)
*H04R 5/04* (2006.01)

(52) U.S. Cl.
CPC .............. *G06F 3/162* (2013.01); *H04R 5/033* (2013.01); *H04R 5/04* (2013.01)

(58) Field of Classification Search
CPC ............ G06F 3/162; H04R 5/033; H04R 5/04
See application file for complete search history.

(56) References Cited

U.S. PATENT DOCUMENTS

| 5,161,021 A | 11/1992 | Tsai |
| 6,388,658 B1 | 5/2002 | Ahern et al. |
| 6,397,269 B1 | 5/2002 | Petty et al. |
| 6,763,522 B1 | 7/2004 | Kondo et al. |
| 2002/0143996 A1 | 10/2002 | Odryna et al. |
| 2003/0110328 A1 | 6/2003 | Seki et al. |
| 2003/0184960 A1 | 10/2003 | Ferguson |

(Continued)

FOREIGN PATENT DOCUMENTS

| CN | 202205133 U | 4/2012 |
| CN | 202472359 U | 10/2012 |

(Continued)

OTHER PUBLICATIONS

Guri, Mordechai & Solewicz, Yosef & Daidakulov, Andrey & Elovici, Yuval. (2016). SPEAKE(a)R: Turn Speakers to Microphones for Fun and Profit.

(Continued)

*Primary Examiner* — Joseph Saunders, Jr.
*Assistant Examiner* — Joseph Saunders
(74) *Attorney, Agent, or Firm* — The Roy Gross Law Firm, LLC; Roy Gross

(57) ABSTRACT

A device comprising: at least two interfaces for interconnecting between at least one audio source and at least one audio sink device; and unidirectional circuitry configured to allow transmission of an audio signal only from said at least one audio source to said at least one audio sink device.

7 Claims, 4 Drawing Sheets

(56) References Cited

U.S. PATENT DOCUMENTS

| | | |
|---|---|---|
| 2003/0217123 A1 | 11/2003 | Anderson et al. |
| 2003/0218578 A1 | 11/2003 | Ahern et al. |
| 2004/0062305 A1 | 4/2004 | Dambrackas |
| 2004/0068737 A1 | 4/2004 | Itoh et al. |
| 2004/0177264 A1 | 9/2004 | Anson et al. |
| 2005/0044184 A1 | 2/2005 | Thomas et al. |
| 2005/0044266 A1 | 2/2005 | O'Neil |
| 2005/0055582 A1 | 3/2005 | Bazakos et al. |
| 2005/0080939 A1 | 4/2005 | Onuma et al. |
| 2005/0286784 A1 | 12/2005 | Gilgen |
| 2005/0289633 A1 | 12/2005 | Dow, III |
| 2006/0067690 A1 | 3/2006 | Tatum et al. |
| 2006/0107061 A1 | 5/2006 | Holovacs |
| 2006/0147214 A1 | 7/2006 | Ruiz et al. |
| 2006/0230110 A1 | 10/2006 | VanHarlingen et al. |
| 2006/0259612 A1 | 11/2006 | De Oliveira et al. |
| 2007/0058657 A1 | 3/2007 | Holt et al. |
| 2007/0085825 A1 | 4/2007 | Geffin et al. |
| 2007/0124474 A1 | 5/2007 | Margulis |
| 2007/0174526 A1 | 7/2007 | Blackwell et al. |
| 2007/0239900 A1 | 10/2007 | Beasley et al. |
| 2007/0261097 A1 | 11/2007 | Siegman et al. |
| 2007/0296714 A1 | 12/2007 | Kim |
| 2008/0126629 A1 | 5/2008 | Huang |
| 2008/0253085 A1 | 10/2008 | Soffer |
| 2008/0288677 A1 | 11/2008 | Kirshtein |
| 2008/0313319 A1 | 12/2008 | Geffin |
| 2009/0058868 A1 | 3/2009 | Kang et al. |
| 2009/0091665 A1 | 4/2009 | Kang et al. |
| 2009/0109345 A1 | 4/2009 | Nori |
| 2009/0125969 A1 | 5/2009 | Hill et al. |
| 2010/0235551 A1 | 9/2010 | Batish et al. |
| 2010/0327059 A1 | 12/2010 | Dean et al. |
| 2011/0026605 A1 | 2/2011 | Costa |
| 2011/0029699 A1 | 2/2011 | Siegman et al. |
| 2011/0032982 A1 | 2/2011 | Costa et al. |
| 2011/0072064 A1 | 3/2011 | Wei et al. |
| 2011/0145451 A1 | 6/2011 | Soffer et al. |
| 2011/0208963 A1 | 8/2011 | Soffer |
| 2011/0304522 A1 | 12/2011 | Zeng et al. |
| 2012/0159651 A1 | 6/2012 | Beacham |
| 2012/0243160 A1 | 9/2012 | Van Nguyen et al. |
| 2012/0257680 A1 | 10/2012 | Dickens et al. |
| 2012/0284736 A1 | 11/2012 | Friedman |
| 2013/0050084 A1 | 2/2013 | Soffer |
| 2013/0067534 A1 | 3/2013 | Soffer |
| 2013/0254439 A1 | 9/2013 | Sundaravel |
| 2014/0019652 A1 | 1/2014 | Soffer |
| 2014/0075535 A1 | 3/2014 | Soffer et al. |
| 2014/0172422 A1 | 6/2014 | Hefetz |
| 2014/0244856 A1 | 8/2014 | Kambhatla |
| 2014/0244880 A1 | 8/2014 | Soffer |
| 2015/0082460 A1 | 3/2015 | Amiga |
| 2015/0135264 A1 | 5/2015 | Amiga |
| 2015/0356045 A1 | 12/2015 | Soffer |
| 2016/0066016 A1 | 3/2016 | Yeh et al. |
| 2016/0110303 A1 | 4/2016 | Wei et al. |
| 2016/0227149 A1 | 8/2016 | Dickens et al. |
| 2016/0371511 A1 | 12/2016 | Balducci |
| 2017/0116147 A1 | 4/2017 | Hsueh |
| 2017/0192745 A1 | 7/2017 | Sunstrum |
| 2017/0195374 A1 | 7/2017 | Vu et al. |
| 2017/0229093 A1 | 8/2017 | Sivertsen et al. |
| 2017/0300371 A1 | 10/2017 | Soffer |
| 2018/0101496 A1 | 4/2018 | Chang et al. |
| 2018/0239719 A1 | 8/2018 | Soffer |
| 2018/0316946 A1 | 11/2018 | Todd |
| 2020/0057508 A1 | 2/2020 | Menachem et al. |
| 2021/0090579 A1* | 3/2021 | Soffer ................. G10L 19/00 |

FOREIGN PATENT DOCUMENTS

| | | |
|---|---|---|
| CN | 202771332 U | 3/2013 |
| CN | 202854720 U | 4/2013 |
| CN | 203930617 U | 11/2014 |
| KR | 20160015829 A | 2/2016 |
| WO | 2018172111 A1 | 9/2018 |
| WO | 2019193590 A1 | 10/2019 |

OTHER PUBLICATIONS

High Sec Labs, "What is Secure KVMA Isolator?", 2015, https://highseclabs.com/wp-content/uploads/2020/10/HKS100I_HVS100I_DS_Rev1.1.pdf.

High Sec Labs, "HSA210 Secure Headphone Diode Datasheet", Feb. 4, 2015, https://highseclabs.com/wp-content/uploads/2020/10/HSA210_DS.pdf.

PCT Search Report for International Application No. PCT/IL2018/050154, dated Jul. 20, 2018, 2 pp.

PCT Written Opinion for International Application No. PCT/IL2018/050154, dated Jul. 20, 2018, 8 pp.

PCT International Preliminary Report on Patentability for International Application No. PCT/IL2018/050154, dated Oct. 8, 2019, 9 pp.

\* cited by examiner

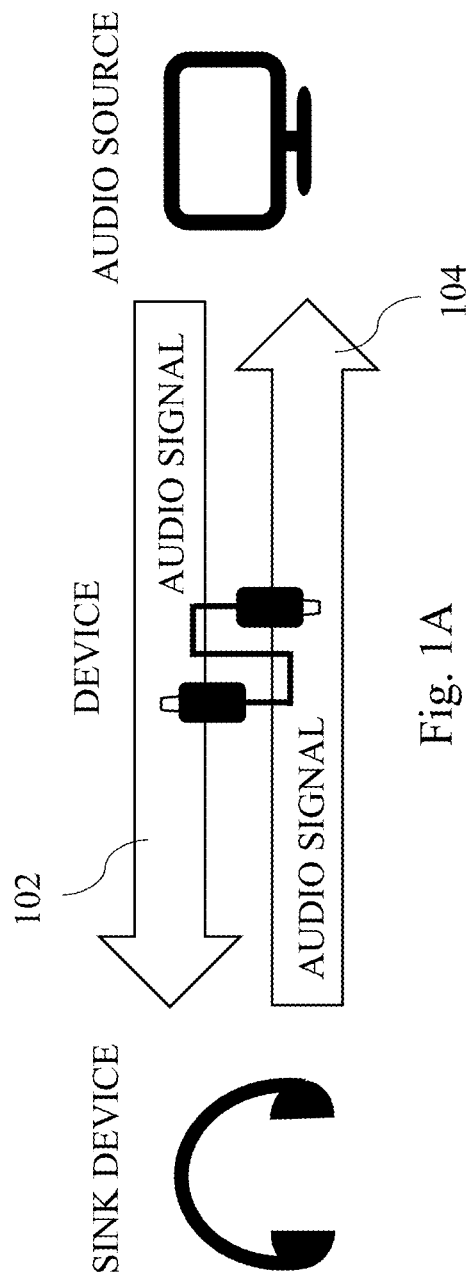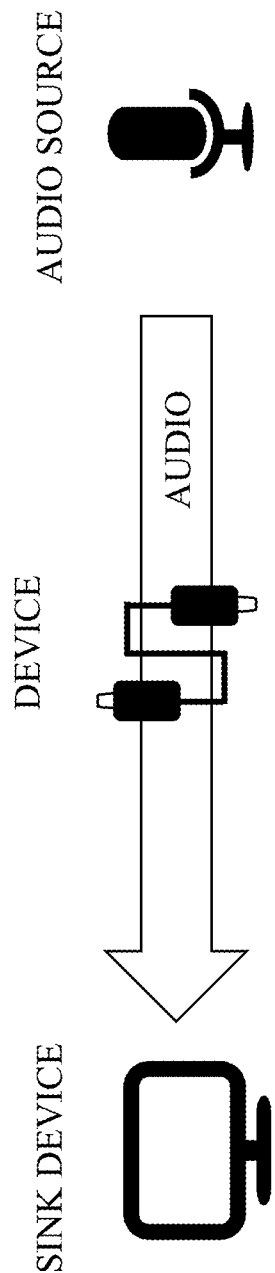

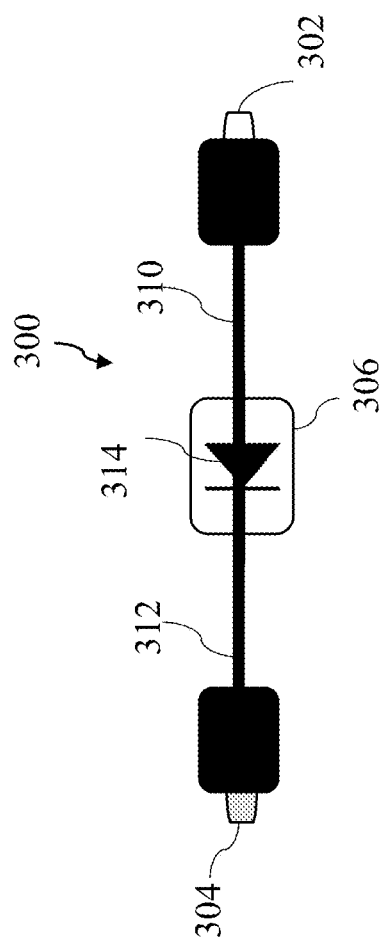
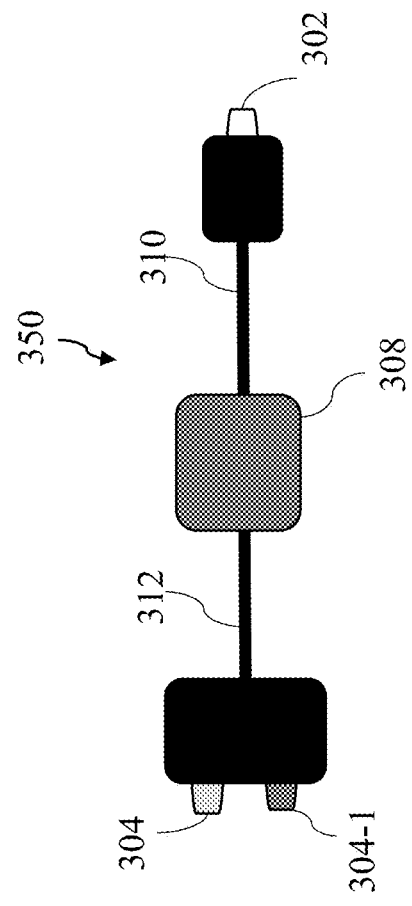
Fig. 3A
Fig. 3B

DEVICE FOR SECURE UNIDIRECTIONAL AUDIO TRANSMISSION

CROSS-REFERENCE TO RELATED APPLICATION

This application is a continuation of U.S. patent application Ser. No. 16/846,547 filed Apr. 13, 2020, which claims the benefit of priority of Israel Patent Application No. 266118 filed Apr. 17, 2019. The contents of the above applications are all incorporated by reference as if fully set forth herein in their entirety.

FIELD OF THE INVENTION

The present invention relates generally to unidirectional audio signal transmission in computer systems.

BACKGROUND OF THE INVENTION

Commonly used audio players and microphones comprise similar hardware and operate using similar sonic principles. Audio players turn electrical signals into sounds, while microphones convert sounds into electrical signals. Commonly used audio players comprise a stationary magnet and a movable diaphragm. The diaphragm is coupled to a coil such that current passing through the coil generates a magnetic field and repels the magnet, thus generating sound waves. Common microphones comprise a magnet and diaphragm which turn sound waves into movements of the diaphragm, which is translated by the coil and magnet into electrical signals. Due to the similarities in hardware it is possible to operate audio players as microphones.

One way of operating an audio player as a microphone involves jack re-tasking. Jack re-tasking, or jack remapping, is a rising concern regarding the ability of audio players hardware to become microphones. In jack re-tasking an audio port is programmed to change its function. Malware and malicious codes which can end up encoded onto a system may re-configurate an audio port, for example, a headphone jack, to function as a microphone jack; turning the port from line out to line in. Therefore, headphones and other audio players connected to a system or device may act as an eavesdropping device.

The foregoing examples of the related art and limitations related therewith are intended to be illustrative and not exclusive. Other limitations of the related art will become apparent to those of skill in the art upon a reading of the specification and a study of the figures.

SUMMARY OF THE INVENTION

The following embodiments and aspects thereof are described and illustrated in conjunction with systems, tools and methods which are meant to be exemplary and illustrative, not limiting in scope.

There is provided, in accordance with an embodiment, a device comprising: at least two interfaces for interconnecting between at least one audio source and at least one audio sink device; and unidirectional circuitry configured to allow transmission of an audio signal only from said at least one audio source to said at least one audio sink device.

There is also provided, in accordance with an embodiment, a method comprising providing a device comprising: at least two interfaces for interconnecting between at least one audio source and at least one audio sink device, and unidirectional circuitry configured to allow transmission of an audio signal only from said at least one audio source to said at least one audio sink device; and transmitting, by said device, an audio signal only from said at least one audio source to said at least one audio sink device.

In some embodiments, said at least one audio source comprises an audio interface, and wherein said device comprises software which configures said audio interface as one of a line-in audio interface and a line-out audio interface.

In some embodiments, said unidirectional circuitry is further configured to allow transmission of said audio signal from said at least one audio sink device to said at least one audio source for a specified period of time. In some embodiments, the method further comprises transmitting said audio signal from said at least one audio sink device to said at least one audio source for said specified period of time.

In some embodiments, said at least one sink device comprises one or more of headphones, microphone, and speaker.

In some embodiments, said audio signal is one of an analog audio signal and a digital audio signal.

In some embodiments, said unidirectional circuitry comprises one or more of: a diode, a fiber-optical diode, a photodiode, an optocoupler, a transmitter optical sub-assembly (TOSA), a receiver optical sub-assembly (ROSA), and a laser diode.

In some embodiments, said interfaces are selected from a group consisting of: USB, HDMI, DIN, RCA jack, VGA, TRS audio jack, TRS minijack, TOSLINK, BNC, XLR, ST optical fiber connector, LC optical fiber connector, audio port, banana plugs, SCART, DisplayPort, and a microphone port. In some embodiments, at least some of the pins in said interfaces are disconnected.

In some embodiments, said unidirectional circuitry comprises a filter configured to allow transmission of an audio signal in a specified frequency range only, from said at least one audio sink device to said at least one audio source. In some embodiments, said specified frequency is between 20 Hz and 10 kHz. In some embodiments, said filter is a bandpass filter configured to block frequencies outside of said specified frequency range of said audio signal.

In addition to the exemplary aspects and embodiments described above, further aspects and embodiments will become apparent by reference to the figures and by study of the following detailed description.

BRIEF DESCRIPTION OF THE DRAWINGS

Exemplary embodiments are illustrated in referenced figures. Dimensions of components and features shown in the figures are generally chosen for convenience and clarity of presentation and are not necessarily shown to scale. The figures are listed below.

FIGS. 1A and 1B are simplified illustrations of a typical audio transmitting arrangement from an audio source to an audio sink device;

FIGS. 3A and 3B are simplified illustrations of a secure audio signal transmission device in accordance with some embodiments of the present invention.

DETAILED DESCRIPTION OF THE INVENTION

Figure 2:
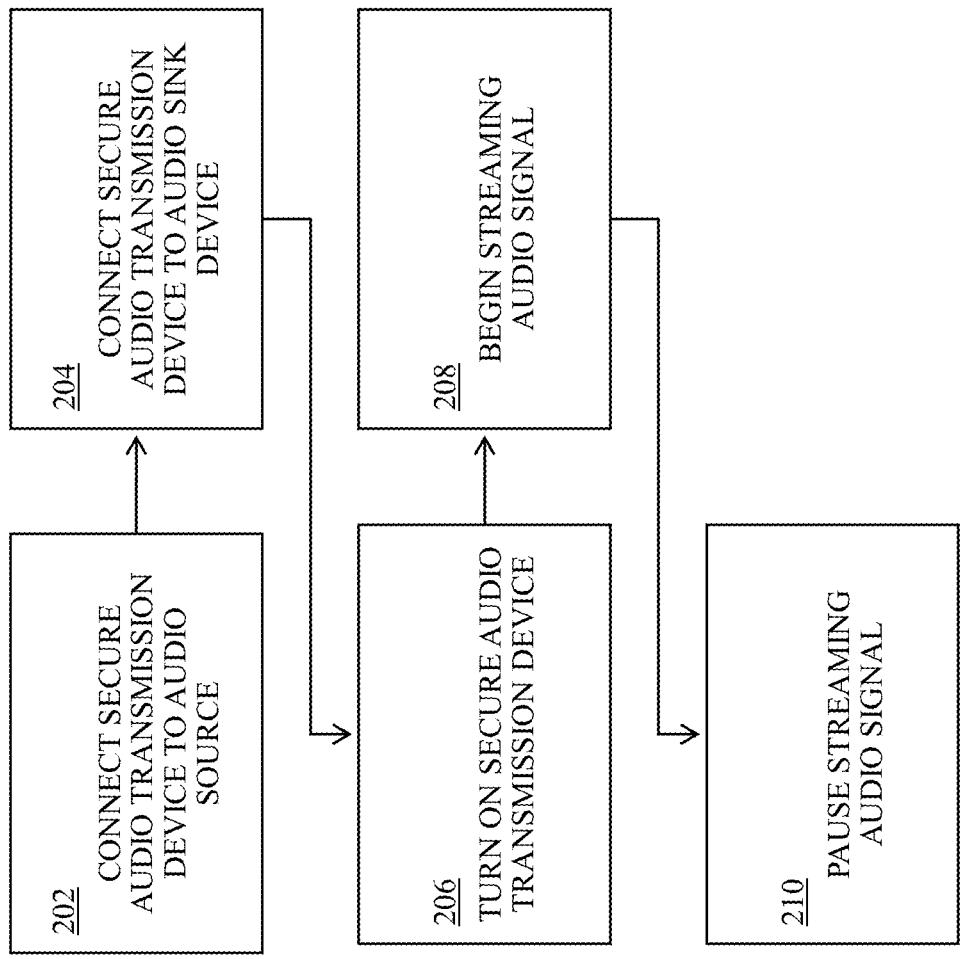
FIG. 2 is a flowchart of the functional steps in setting up and using a secure audio signal transmission device in accordance with some embodiments of the present invention.

Disclosed are a device and a method for secure transmission of audio signals from an audio source to an audio sink device.

It is commonly known that hardware which is configured to be an audio sink device, such as, for example, loudspeakers, headsets, headphones and the like, may be operated as a microphone and used for eavesdropping purposes. In some case, such devices may carry back an audio signal, which may be a relatively weak signal, representing, e.g., ambient sounds in the surrounding areas of the device.

A security issue may arise, for example, when a system is infected with malicious code planted by a hostile entity. Such a code may be configured to eavesdrop on the surrounding area of the system, e.g., by monitoring the signal carried back the audio sink device into a line-out port. In another example, such code may reconfigure, for example, a line-out audio port to which such devices, such as headphones, are coupled, to operate as a line-in port, wherein the headphones act as a microphone to eavesdrop on the surrounding area of the system.

Some commonly used devices and systems, such as computers and televisions, comprise a plurality of audio signal transmitting ports and microphone ports. Additionally, some commonly used devices and systems, such as smartphones, comprise a single port used for both audio players and microphones.

Other system and arrangements which may present these risks include public address and/or announcement systems, comprising a plurality of loudspeakers which may be deployed within an organization, e.g., in sensitive areas where eavesdropping may pose a risk. Because the components of such systems are sometimes distributed within large areas and/or buildings, a hostile entity can relatively easily connect operatively to, e.g., system wirings, in a way that does not negatively affect system signals and is therefore difficult to detect. Thus, audio sink devices deployed throughout an organization may be repurposed by a hostile entity for eavesdropping purposes, by collecting an audio signal transmitted back over audio lines connected through an area and/or building.

Therefore, a system comprising an audio source configured to transmit audio signals to an audio sink device, may be used as an eavesdropping device. Hackers, malware, and malicious codes encoded within a system may manipulate the software and/or hardware of a system such that the audio source within the system receives audio signals from an audio sink device. It will be appreciated that similar security risks may therefore exist within any system or processor which couples to an audio sink device.

The term "audio signal" in this disclosure may refer to any signal, analog or digital, which may be passed from one device to another.

In some embodiments, the present device is a secure audio signal transmission device which couples to a system and secures the transmission of audio signals from an audio source within said system to an audio sink device. In some embodiments, the secure audio signal transmission device couples between an audio source and an audio sink device.

In some embodiments, the present invention enforces complete unidirectionality of audio signals, only allowing transmission of signals from the audio source to the audio sink device.

In some embodiments, the present device enables transmission of an audio signal securely from an audio source to an audio sink device. In some embodiments, the secure audio signal transmission device connects to at least one audio source through at least one audio source interface. In some embodiments, the secure audio signal transmission device connects to at least one audio sink device through at least one audio sink device interface. In some embodiments, the secure audio signal transmission device prevents the audio sink device from transmitting audio signals to the audio source and/or any other appliance which may be connected and/or coupled to the system's wiring.

In some embodiments, the secure audio signal transmission device comprises unidirectional circuitry. In some embodiments, the unidirectional circuitry prevents transmission of audio signals from the audio sink device back to the audio source. In some embodiments, the secure audio signal transmission device comprises a diode, such as but not limited to, a fiber-optical diode, a photodiode, an optocoupler, a transmitter optical sub-assembly (TOSA) and/or receiver optical sub-assembly (ROSA), and a laser diode. In some embodiments, the unidirectional circuitry only allows transmission of audio signals from the audio source interface to the audio sink device interface.

In some embodiments, unidirectionality is achieved by a digital-to-analog (D/A) and/or analog-to-digital (A/D) conversion of the audio signal (e.g., by sampling an analog audio signal). For example, when an audio sink device is connected thorough a digital port (e.g., a universal serial bus, USB, port). In such cases, any signal representing ambient sounds and carried back from the audio sink device is blocked by the conversion to digital signal and cannot be used for eavesdropping.

In some embodiments, the secure audio signal transmission device comprises at least one filter. In some embodiments, the filter is configured to limit the frequencies transmitted through the secure audio signal transmission device, to prevent passing of other information through the audio lines. In some embodiments, a user may set the parameters of the filter, for example, filter type, the corner frequency, band width, attenuation, attenuation rate, and any combination thereof.

In some embodiments, the secure audio signal transmission device is configured to couple to one or more of an audio player and/or a microphone. In some embodiments, a microphone may be coupled to the secure audio transmission device. In some embodiments, the secure audio signal transmission device comprises a microphone mode. In some embodiments, the microphone mode allows transmission of audio signals from the audio source interface to the audio sink device interface. In some embodiments, the microphone mode is enabled by command of a user and/or a control unit of the secure audio transmission device. In some embodiments, the device comprises, e.g., a push-to-talk or similar button which enables a user to operate a microphone mode of the device. In some embodiments, the device is configured to automatically disable a microphone mode and/or disconnect a microphone, e.g., after a specified period of time, to prevent prolonged exposure to possible eavesdropping of ambient sounds.

In some embodiments, the secure audio signal transmission device is coupled to a system which comprises at least one audio port and at least one driver. In some embodiments, the secure audio signal transmission device is used to re-program the driver. In some embodiments, the secure audio signal transmission device is used to re-task or remap at least one audio port. In some embodiments, the audio port is re-tasked or remapped to operate as a line-out only audio port, such that no audio signal may be transmitted into the audio source.

In some embodiments, the secure audio signal transmission device comprises a plurality of ports and/or connectors, such that the secure audio signal transmission device may couple to more than one type of audio source and/or more than one type of audio sink device.

Reference is made to FIGS. 1A and 1B which are simplified illustrations of a typical audio signal transmitting arrangement from an audio source to an audio sink device. In a typical audio signal transmission arrangement, the audio signal is transmitted from the audio source to the audio sink device.

In some embodiments, such as depicted by FIG. 1A, the audio sink device is an audio player, such as but not limited to, headphones and loudspeakers. In some embodiments, the audio source is integral to or coupled to a system such as, but not limited to, a computer, mp3 player, smartphone, public address and/or announcement systems, and the like. In a typical audio signal transmission arrangement, an audio signal is transmitted in the direction as depicted by arrow 102, from the audio source to the audio sink device. However, in non-secured arrangements, audio signals may be transmitted from the audio sink device to the audio source, as illustrated by arrow 104, and used as eavesdropping devices.

In some embodiments, such as depicted by FIG. 1B, the audio source of a typical audio transmission arrangement is a microphone. In some embodiments, such as depicted by FIG. 2B, the audio sink device to which the audio source transmits an audio signal is a system such as, but not limited to, a computer, mp3 player, smartphone, public address and/or announcement system and the like.

In some embodiments, the secure audio signal transmission device provides an anti-eavesdropping security measure. In some embodiments, the secure audio signal transmission device enforces audio signal unidirectionality, such that that audio devices which are coupled to a system and are configured to operate as audio sink devices are not used to transmit audio signals from the audio sink devices.

The functional steps in using the secure audio signal transmission device are described with reference to the flowchart in FIG. 2.

At a step 202, the secure audio signal transmission device 300/350 (FIG. 3) is connected to audio source, e.g., through audio source interface 302. At a step 204, the audio signal transmission device 300/350 is connected to an audio sink device, e.g., through audio source interface 304. At a step 206, the secure signal audio transmission device 300/350 is turned on. At a step 208, an audio signal begins transmission and is transmitted from the audio source to the audio sink device, wherein the transmission is unidirectional, such that no audio signal may be transmitted back to the audio source.

At a step 210, the transmission of the audio signal is paused. In some embodiments, during the step 210 the audio sink device does not receive an audio signal from the audio source. In some embodiments, during step 210 the secure audio signal transmission device 300/350 prevents the transmission of an audio signal from the audio sink device to the audio source.

Reference is now made to FIGS. 3A and 3B, which are simplified illustrations of a secure audio signal transmission device in accordance with some embodiments of the present invention. In some embodiments, the secure audio signal transmission device 300/350 is configured to at least:

(i) Provide for transmitting audio signals from audio source to audio sink device; and/or
(ii) Prevent audio signal transmission from the audio sink device to the audio source.

In some embodiments, the secure audio signal transmission device 300/350 comprises at least two interfaces. In some embodiments, at least one of the interfaces is an audio source interface 302. In some embodiments, at least one of the interfaces is an audio sink device interface 304. In some embodiments, the secure audio signal transmission device 300/350 comprises unidirectional circuitry 306. In some embodiments, the unidirectional circuitry 306 is configured to allow transmission of an audio signal only from at least one audio source interface 302 to at least one audio sink device interface 304.

In some embodiments, the secure audio signal transmission device 300/350 is coupled to a system such as, for example, a computer system, smartphone, mp3 player, public address and/or announcement system and the like. In some embodiments, the secure audio signal transmission device 300/350 is coupled to the system by the audio source interface 302.

In some embodiments, the audio source interface 302 and/or the audio sink device interface 304 is configured to couple to a port, such as but not limited to, USB, HDMI, DIN, RCA jack, VGA, TRS audio jack, TRS minijack, TOSLINK, BNC, XLR, ST optical fiber connector, LC optical fiber connector, audio port, 3.5 mm or 2.5 mm audio jacks, SCART, DisplayPort, and a microphone port.

In some embodiments, the audio source interface 302 and/or the audio sink device interface 304 is a port, such as but not limited to, USB, HDMI, DIN, RCA jack, VGA, TRS audio jack, TRS minijack, TOSLINK, BNC, XLR, ST optical fiber connector, LC optical fiber connector, audio port, banana plugs, SCART, DisplayPort, and a microphone port.

In some embodiments, the secure audio signal transmission device 300/350 is coupled to an audio sink device and/or coupled to an audio source by any one or more of a wireless connection such as, but not limited to, Bluetooth and Wi-Fi.

In some embodiments, unidirectionality may be enforced by disconnecting at least one pin of a connection port of the audio sink device interface 304 and/or the audio source interface 302. In some embodiments, the output pins of the audio sink device interface 304 are disconnected. A potential advantage of disconnecting the output pins of the audio sink device interface 304 is that no audio signal output will be able to transmit from the audio sink device into the audio sink device interface 304.

In some embodiments, transmission of audio from the sink side back to the source side may be permitted, e.g., for short periods of time, for example, in the case of a computer headset that includes a microphone for Skype calls.

In some embodiments, the at least one audio sink device interface 304 each comprise more than one type of port. In some embodiments, the at least one audio source interface 302 comprises more than one type of connector. In some embodiments, the audio source interface 302 is compatible with more than one type of port.

In some embodiments, the device comprises at least one audio sink device interface side 312 and at least one audio source interface side 310. In some embodiments, the audio sink device interface side 312 is coupled between at least one audio sink device interface 304 and at least one unidirectional circuitry 306. In some embodiments, the audio source interface side 310 is coupled between at least one audio source interface 302 and at least one unidirectional circuitry 306.

In some embodiments, the secure audio signal transmission device 300/350 is integral with a system comprising an audio source.

In some embodiments, the unidirectional circuitry 306 is configured to transmit audio signal only from the audio source interface 302 to the audio sink device interface 304. In some embodiments, the unidirectional circuitry 306 comprises one or more diodes 314. In some embodiments, the unidirectional circuitry 306 comprises one or more of a fiber-optical diode, a photodiode, a laser diode, a transmitter optical sub-assembly (TOSA), a receiver optical sub-assembly (ROSA), and the like.

Figure 4:
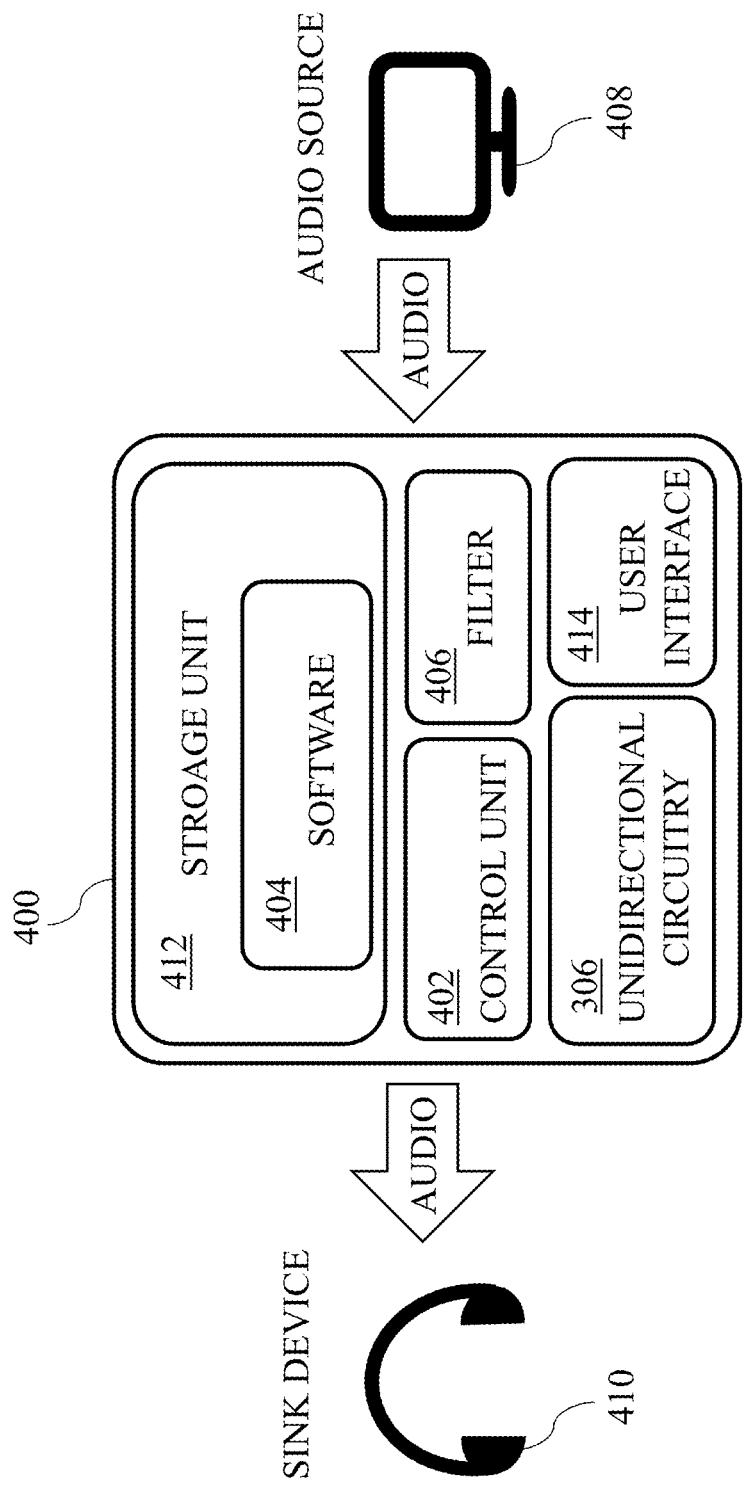
FIG. 4 is an exemplary secure audio signal transmission device in accordance with some embodiments of the present invention.

In some embodiments, and as described in FIG. 3B, the secure audio signal transmission device 350 comprises a circuit 308. In some embodiments, an as described in greater detail herein, the circuit comprises at least one filter 406 (FIG. 4). In some embodiments, the circuit 308 comprises at least one diode 314. In some embodiments, the circuit 308 couples to at least one audio sink device interface 304 and/or at least one audio source interface 302. In some embodiments, the circuit 308 comprises at least one filter 406 and at least one diode 314 in any combination thereof.

In some embodiments, the diode 314 is configured to prevent transmission of audio signals from the audio sink device interface 304 to the audio source interface 302.

Reference is made to FIG. 4, which is an exemplary secure audio signal transmission device in accordance with some embodiments of the present invention. In some embodiments, the secure audio signal transmission device 400 is similar to the secure audio signal transmission device 300/350.

In some embodiments, the secure audio signal transmission device 400 comprises at least one control unit 402, such as a processor. In some embodiments, the control unit 402 is coupled to the unidirectional circuitry 306. In some embodiments, the secure audio signal transmission device 400 comprises at least one storage unit 412. In some embodiments, one or more software components 404 are encoded onto the storage unit 412. In some embodiments, the secure audio signal transmission device 400 comprises at least one filter 406. In some embodiments, the secure audio signal transmission device 400 comprises a user interface module 414.

In some embodiments, audio signals transmitted from the audio source 408 are transmitted through the unidirectional circuitry 306 and/or at least one filter 406, or any combination thereof.

In some embodiments, the filter 406 is used alternatingly with the unidirectional circuitry 306. In some embodiments, and as described in greater detail elsewhere herein, the secure audio signal transmission device 300/350/400 comprises a microphone work mode in which a microphone is coupled to the audio sink device interface 304-1. In some embodiments, when the microphone work mode is turned on when a microphone is coupled to the secure audio signal transmission device 300/350/400.

In some embodiments, an audio signal is transmitted through the filter 406 at the microphone work mode. In some embodiments, there are two unidirectional circuitry 306 and 308 at the opposite sides microphone, to permit time-limited bi-directionality work mode. In some embodiments, at the microphone work mode, the audio signal is transmitted from the audio sink device interface 304-1 to the audio source interface 302 through a circuit 308. In some embodiments, one or more filters 406 are configured to filter audio signals which are transmitted from the microphone to the audio source interface 302 and/or from audio source interface 302 to audio sink interface 304, 304-1 (e.g., headphones).

In some embodiments, the filter 406 is one or more of an audio filter, a band-pass filter, high-pass filter, low-pass filter, band-stop filter, comb filter, and all-pass filter. In some embodiments, the filter 406 is an analog filter. In some embodiments, the filter 406 is a digital filter.

In some embodiments, the filter 406 is configured to pass through only a specified frequency range of said audio signals. In some embodiments, the filter 406 is configured to block frequencies outside of said specified frequency range of said audio signal. In some embodiments, the specified frequency is between 20 Hz and 10 kHz. In some embodiments, and as described in greater detail elsewhere herein, the specified frequency range is set by a user.

In some embodiments, the filter 406 attenuates audio signals of specific ranges. In some embodiments, the filter 406 attenuates audio signals transmitted from the audio source 408 to the sink device 410. For example, in some embodiments, the attenuation rate is negative 60 dB/decade. In some embodiments, the filter 406 comprises an audio signal amplifier.

In some embodiments, the filter 406 has at least one corner frequency. For example, in some embodiments, the corner frequency of the filter 406 is 10 kHz. In some embodiments, the corner frequency is set by a user. In some embodiments, the corner frequency is predetermined.

In some embodiments, the control unit 402 commands the operation of the filter 406. In some embodiments, the control unit 402 receives user input to determine one or more of the filter types, the corner frequency, band width, attenuation, and/or attenuation rate of the filter 406. In some embodiments, the control unit 402 is coupled to a user interface module 414.

In some embodiments, the control unit 402 is in communication with the storage unit 412. In some embodiments, the storage unit 412 comprises preset settings for any one of the filter types, the corner frequency, band width, attenuation, attenuation rate, and any combination thereof.

In some embodiments, the control unit 402 commands the operation of the secure audio signal transmission device 400 and/or the operation of any one of the filters, the unidirectional circuitry 306, and the storage unit 412.

In some embodiments, the storage unit 412 has encoded thereon software instructions or components configured to operate a processing unit, such as the control unit 402. In some embodiments, the software components 404 may include an operating system, including various software components and/or drivers for controlling and managing general system tasks (e.g. memory management, storage device control, power management, etc.), and facilitating communication between various hardware and software components. In some embodiments, the program instructions are segmented into one or more software modules.

In some embodiments, the software components 404 are configured to re-task one or more ports of the secure audio signal transmission device 400. In some embodiments, the software components 404 are configured to re-task one or more ports in communication with any device to which the secure audio signal transmission device 400 is coupled.

In some embodiments, the audio source 302/408 is integral to a system, such as a computer system, comprising a driver. In some embodiments, the software components 404 are configured to reprogram a driver to which the audio source 302/408 is integral or coupled. In some embodiments, the software components 404 are configured to reprogram a driver such that audio ports of said system only allow transmission of audio signals from the audio source 302/408 to the audio sink device 410.

In some embodiments, the secure audio signal transmission device 300/350/400 comprises at least one user interface module 414. In some embodiments, the user interface module 414 comprises an operation on/off button. In some embodiments, the user interface module 414 comprises any one or more of a knob, button, touch screen, display screen, and the like. In some embodiments, the user interface module 414 allows a user to set any one or more of the duration of operation, the filter type, the corner frequency, band width, attenuation, attenuation rate, work mode (i.e., microphone work mode), and audio signal volume.

In some embodiments, a user may choose any one or more of the duration of operation, the filter type, the corner frequency, band width, attenuation, attenuation rate, work mode (i.e., microphone work mode), and audio signal volume from a predetermined settings saved onto the storage unit. In some embodiments, a user may save specific settings onto the storage unit.

In some embodiments, the secure audio signal transmission device 300/350/400 comprises a microphone port at the audio sink device interface 302. In some embodiments, when a microphone is connected to the audio sink device interface 302 through a microphone port, the secure audio signal transmission device 300/350/400 allows audio signal transmission from the audio sink interface 302 to the audio source interface 304. In some embodiments, the audio signal is transmitted through a filter 306.

In some embodiments, the secure audio signal transmission device 300/350/400 comprises a microphone work mode configured to allow audio signal transmission from the audio sink interface 302 to the audio source interface 304. In some embodiments, the microphone work mode of the secure audio signal transmission device 300/350/400 is operated by a user. In some embodiments, the microphone work mode is operated by the control unit 402. In some embodiments, the microphone work mode is operated by the user interface module 414.

In some embodiments, a Universal Serial Bus (USB) can be used as a line-in and/or line-out port which transmits a unidirectional digital audio signal, in such case, the present device may be, e.g., a USB dongle and/or a similar device.

In some embodiments, a device of the present disclosure may from part or all of another device. For example, the present device may form part of a keyboard/video/mouse (KVM), secure keyboard/video/mouse (SKVM), a keyboard/mouse/audio (KMA), a Secure keyboard/mouse/audio (SKMA), and/or a similar device.

In some embodiments, the present device may be is used to extract or de-extract (insert) audio to or from the USB interface.

In some embodiments, a secure audio signal transmission device of the present disclosure may be disposed within a case, e.g., a protective case in some embodiments, such a case may have, e.g., length/width/height dimensions of 100 mm, 55 mm, and 22 mm, respectively. In some embodiments, a protective case of the present disclosure may comprise one or more cable connections.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this invention, but only by the claims that follow.

What is claimed is:

1. A secure audio transmission device integral with an audio source device, said secure audio transmission device comprising:
   two or more audio sink interfaces, adapted to connect to two or more audio sink devices of different types;
   a button, configured to receive a first setting;
   at least one first unidirectional circuitry, configured to allow, in a first work mode of said first setting, unidirectional transmission of an audio signal only from the audio source device to the two or more audio sink interfaces, according to the first setting;
   at least one second unidirectional circuitry, configured to allow, in a second work mode of said first setting, unidirectional transmission of an audio signal only from at least one of the two or more audio sink interfaces to the audio source device, according to the first setting; and
   wherein said first unidirectional circuitry and said second unidirectional circuitry are further configured to allow, in a third work mode of said first setting, time-limited bidirectional transmission between at least one of the two or more audio sink devices and the audio source device.

2. The secure audio transmission device of claim 1, wherein the two or more audio sink interfaces are selected from a list consisting of HDMI, DIN, RCA jack, VGA, TOSLINK, BNC, XLR, ST optical fiber connector, LC optical fiber connector, SCART, and DisplayPort.

3. The secure audio transmission device of claim 1 further comprising:
   a filter configured to allow transmission of an audio signal in a specified frequency range only, from at least one of the two or more audio sink devices to the audio source device; and
   a user interface (UI), configured to receive at least one second setting, said at least one second setting is selected from a list consisting of: the filter type, a corner frequency of the filter, a band width of the filter, an attenuation of the filter, an attenuation rate of the filter, and an amplification of the filter.

4. The secure audio transmission device of claim 1 further comprising a user interface (UI), configured to receive at least one second setting of re-tasking or remapping of said two or more audio sink interfaces.

5. A method comprising:
   connecting a secure audio transmission device to two or more audio source devices;
   connecting the secure audio transmission device to at least one audio sink interface, adapted to connect to at least one audio sink device;
   receiving, via a user interface, at least one setting;
   controlling a first unidirectional circuitry, to allow, in a first work mode of said first setting, unidirectional transmission of an audio signal only from at least one audio source device of the two or more audio source devices to said at least one audio sink interface, according to the at least one setting;
   controlling a second unidirectional circuitry, to allow, in a second work mode of said first setting, unidirectional transmission of an audio signal only from the at least one audio sink interface to the at least one audio source device of the two or more audio source devices, according to the at least one setting; and controlling said first unidirectional circuitry and said second unidirectional circuitry to further allow, in a third work mode of said first setting, time-limited bidirectional transmission between at least one of the two or more audio sink devices and the audio source device.

6. The method of claim 5, wherein the two or more audio source devices are selected from a list consisting of a computer system, a smartphone, an MP3 player, and public announcement system.

7. The method of claim 5, wherein connecting the secure audio transmission device to two or more audio source devices comprises coupling the secure audio transmission device to the two or more audio source devices via a wireless communication network.

\* \* \* \* \*